(12) United States Patent
Kondo

(10) Patent No.: US 8,721,008 B2
(45) Date of Patent: May 13, 2014

(54) HUB DEVICE FOR BICYCLE

(75) Inventor: Yutaka Kondo, Aichi (JP)

(73) Assignee: Gokiso Giken Co., Ltd., Aichi (JP)

( * ) Notice: Subject to any disclaimer, the term of this patent is extended or adjusted under 35 U.S.C. 154(b) by 572 days.

(21) Appl. No.: 13/060,214

(22) PCT Filed: Oct. 14, 2010

(86) PCT No.: PCT/JP2010/068032
§ 371 (c)(1),
(2), (4) Date: Feb. 22, 2011

(87) PCT Pub. No.: WO2011/129027
PCT Pub. Date: Oct. 20, 2011

(65) Prior Publication Data
US 2011/0248556 A1    Oct. 13, 2011

(51) Int. Cl.
*B60B 27/02* (2006.01)
(52) U.S. Cl.
USPC ................................... 301/110.5; 301/110.6
(58) Field of Classification Search
USPC .............................. 301/110.5, 110.6; 384/545
See application file for complete search history.

(56) References Cited

U.S. PATENT DOCUMENTS 6,406,101 B2 *  6/2002  Lund .......................... 301/110.5
6,431,658 B1 *  8/2002  Nakajima et al. ............... 301/59

FOREIGN PATENT DOCUMENTS

| JP | 2001270305 A | 10/2001 |
| JP | 2005231501 A | 9/2005 |

OTHER PUBLICATIONS

International Search Report for corresponding International Application No. PCT/JP2010/068032, mailed Jan. 18, 2011 (8 pages).
Written Opinion of the International Searching Authority issued in PCT/JP2010/068032, mailed Nov. 6, 2012 (6 pages).

* cited by examiner

*Primary Examiner* — Joseph Pape
*Assistant Examiner* — Dana Ivey
(74) *Attorney, Agent, or Firm* — Osha Liang LLP

(57) ABSTRACT

A hub device for a bicycle includes a hub case which is attached to a center of a wheel for receiving a load exerted from a rim to which a tire is fitted, and formed to have each inner diameter of both end portions larger than a diameter of a center portion, a sleeve with plural slits in a circumferential direction and a cylindrical shape integrally attached to the hub case at the inner diameter side, which serves to transfer the load exerted to the hub case to a shaft, a bearing for receiving the load exerted to the sleeve and rotatably supporting a whole structure of the wheel, a shaft for rotatably supporting the whole structure of the wheel via the bearing, and spherical washers attached to both end portions of the shaft.

3 Claims, 5 Drawing Sheets

HUB DEVICE FOR BICYCLE

BACKGROUND OF THE INVENTION

1. Field of the Invention

The present invention relates to a hub device for a bicycle, and more particularly, to a hub device for a bicycle for supporting a rotary motion of a wheel and serving to transfer the load from the wheel to a fork or the like which partially forms a frame.

2. Description of the Related Art

The generally employed hub device for a bicycle disclosed in Japanese Unexamined Patent Application Publication No. 2005-231501 includes a hub case which receives the load exerted to a rim to which the tire is fitted via a spoke, a bearing for rotatably supporting the hub case, and a shaft for receiving the load exerted to the hub case via the bearing and supporting the rotary motion of the hub case.

The aforementioned generally employed device is structured to employ a single row angular contact ball bearing as the bearing interposed between the shaft and the hub case. Accordingly, during traveling by bicycle, vibration or impact resulting from running on the rough road surface may be exerted to the above-structured bearing from the wheel. The exerted load owing to such vibration and the like may cause the risk of damaging the bearing or the hub case.

SUMMARY OF THE INVENTION

It is an object of the present invention to provide a hub device for a bicycle of load distribution type, which is structured to have the load exerted to the hub case from the wheel temporarily received by the sleeve and the like with a wide pressure receiving area, and to apply the load exerted to the sleeve to the shaft via the ball bearings attached to both end portions of the shaft.

According to the present invention, a hub device for a bicycle for supporting a rotary motion of a wheel includes a hub case which is attached to a center portion of the wheel for receiving a load exerted from a rim to which a tire is fitted via a spoke, and formed to have each inner diameter of end portions larger than a diameter of the center portion, a sleeve integrally attached to the hub case at a side of the inner diameter of the hub case, which serves to transfer the load exerted to the hub case to a shaft, a bearing for receiving the load exerted to the sleeve and rotatably supporting a whole structure of the wheel which includes the sleeve and the hub case, and a shaft for rotatably supporting the whole structure of the wheel via the bearing.

According to the present invention, the sleeve is formed of a cylindrical member, and plural predetermined slits are formed around both end portions of the cylindrical member in a circumferential direction.

According to the present invention, predetermined external screws are provided at both end portions of the shaft outside a portion to which the bearing is attached. A nut engaged with the external screw for fixing the bearing has a concave surface opposite a surface in contact with the bearing. A spherical washer has a convex surface engaged with the concave surface, and an O-ring formed of a rubber elastic member disposed in the inner diameter surface to which the shaft is fitted.

According to the present invention, a hub device for a bicycle for supporting a rotary motion of a wheel includes a hub case attached to a center portion of the wheel for receiving a load exerted from a rim to which a tire is fitted via a spoke, a bearing attached to an inner diameter side of the hub case, which serves to transfer the load exerted to the hub case to a shaft, and rotatably support a whole structure of the wheel which includes the hub case, a shaft for rotatably supporting the whole structure of the wheel via the bearing, a nut provided at both end portions of the shaft, and engaged with an external screw formed outside a portion to which the bearing is attached for fixing the bearing, and a spherical washer formed to have a convex surface to be engaged with a concave surface of the nut opposite a side in contact with the bearing and an O-ring formed of a rubber elastic member disposed at the inner diameter side to which the shaft is fitted.

According to a first aspect of the present invention, the aforementioned structure allows the load exerted from the wheel to be applied to the bearing via the hub case and the sleeve so as to be transferred from an inner race of the bearing to the shaft. In the preset invention, the sleeve is structured to have the center portion fitted to an inner diameter portion of the hub case via press fitting means. The hub case for storing the sleeve is structured to have each inner diameter of both end portions larger than the inner diameter of the center portion. In other words, at each area around both end portions of the above-structured sleeve has a predetermined gap between the inner diameter portion of the hub case and the outer circumference of the sleeve in the radial direction. When the load from the wheel is exerted to the hub case, and further transferred to the sleeve, the load will be transferred to the shaft via the bearings attached to both end portions of the sleeve. It serves to elastically deform terminal end portions of the sleeve toward the gap formed at the inner diameter side of the hub case. The elastic deformation alleviates the exerted load so as to be transferred to the bearing. According to the present invention, the elastic deformation of the sleeve alleviates the impact load or vibration so as to be applied to the bearing, shaft and the like. This makes it possible to protect the bearings.

According to the first aspect of the present invention, the cylindrical member is used for forming the sleeve, and plural predetermined slits are formed in areas around both end portions of the cylindrical member in the circumferential direction so that those areas around the end portions of the sleeve are elastically deformed with flexibility. As a result, the impact load or vibration exerted to the wheel may be alleviated and then transferred to the bearings and the like. This makes it possible to sufficiently protect the bearing, and to prevent the spoke from being damaged.

According to the first aspect of the present invention, as the wheel is assembled to the bicycle body via a spherical washer, no pinch occurs around the assembly portion. This may prevent generation of the undue bending moment around the shaft. As a result, the excessive load exerted to the assembly portions of the shaft and the fork may be avoided, thus ensuring smooth rotary motion of the bearing and the like. This makes it possible to protect the bearing, and to keep the smooth rotary motion of the wheel.

According to a second aspect of the present invention, the wheel is assembled to the fork as the member of the bicycle body via the spherical washer to prevent generation of the pinch around the assembly portion. This may prevent generation of the undue bending moment around the shaft. As a result, excessive load exerted to the shaft or the assembly portion of the fork may be avoided, thus protecting the bearing. This also ensures the smooth rotary motions of the bearing and the wheel.

DESCRIPTION OF THE PREFERRED EMBODIMENT

Figure 1:
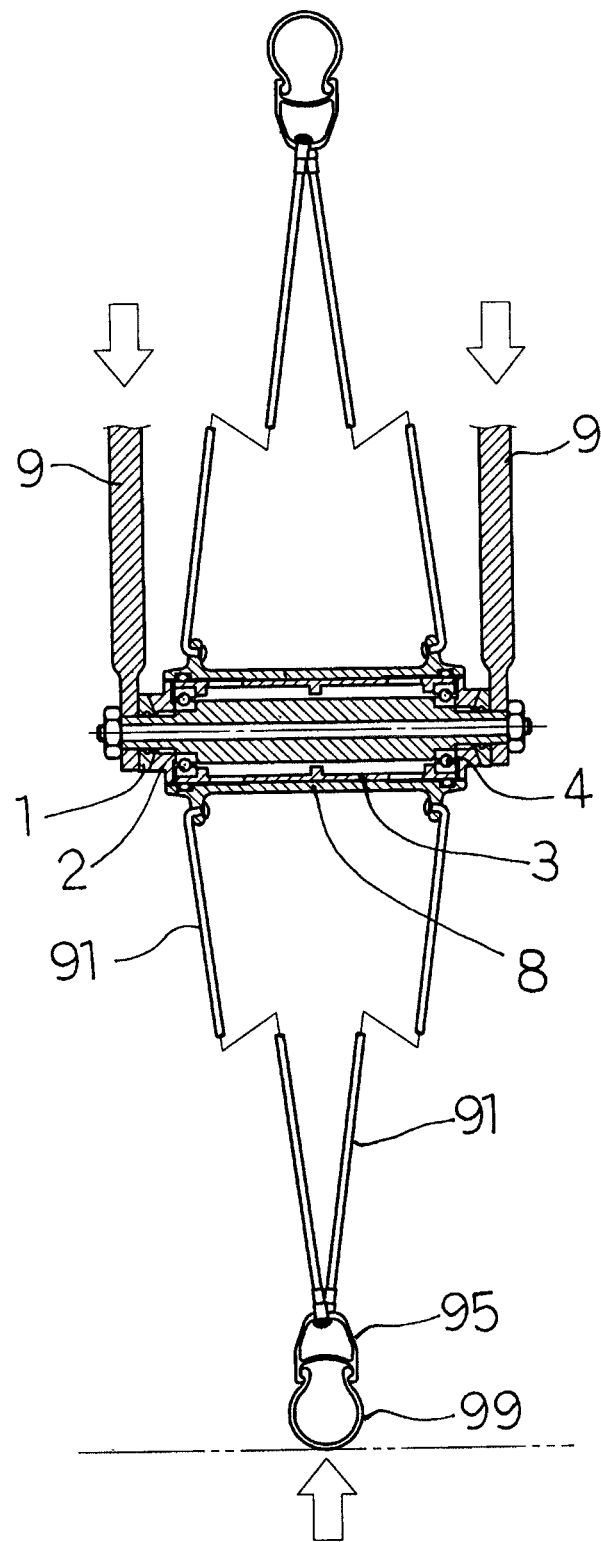
FIG. 1 is a longitudinal sectional view of a whole structure of the present invention.
Figure 2:
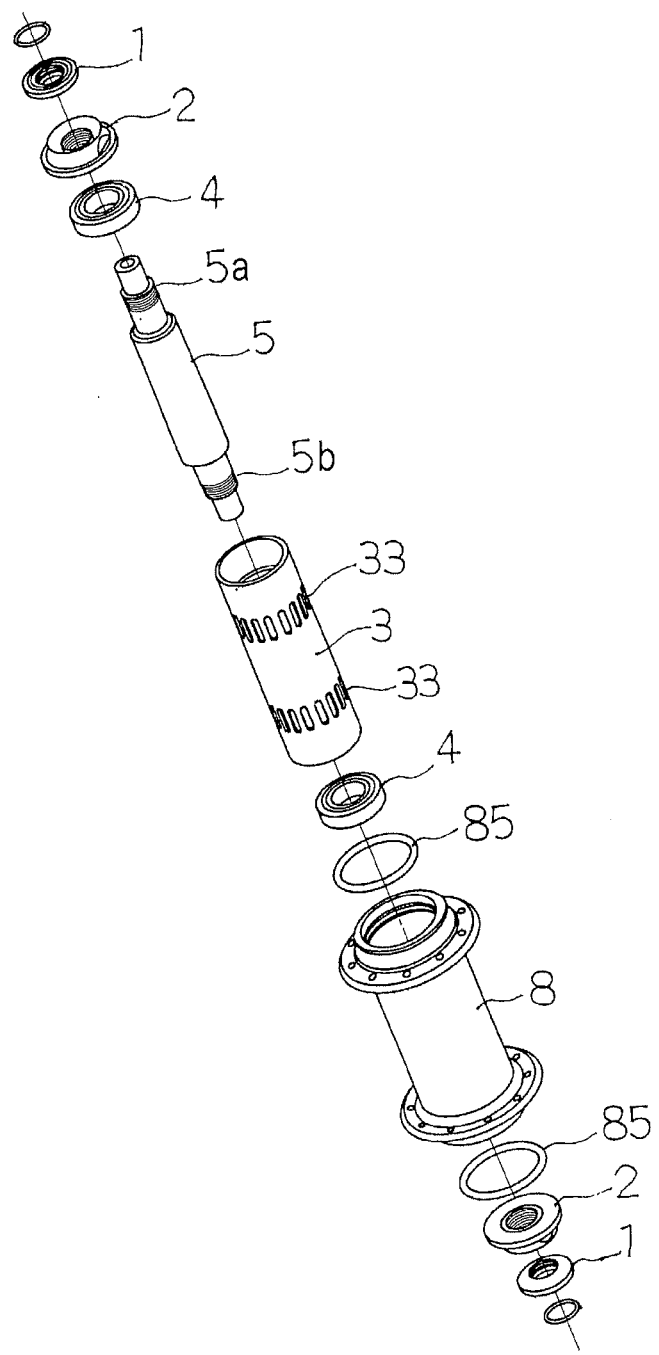
FIG. 2 is a development perspective view illustrating a whole structure of a hub device as a main part of the present invention.
Figure 3:
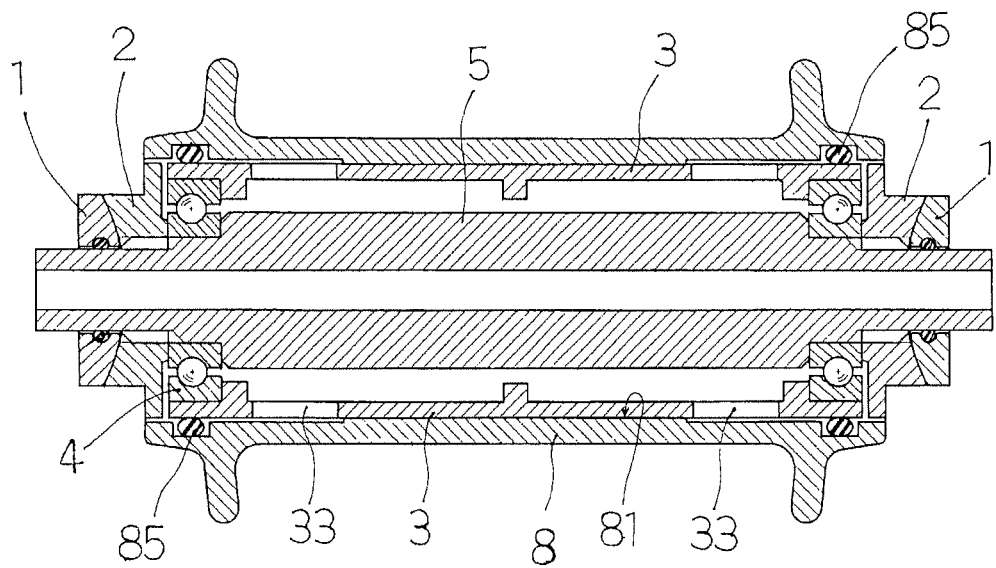
FIG. 3 is a longitudinal sectional view of the whole structure of the hub device as the main part of the present invention.

An embodiment of the present invention will be described referring to FIGS. 1 to 5. FIG. 1 shows a hub device for a bicycle according to the embodiment, which is attached to a two-pronged fork 9, receives the load exerted from a tire 99 or a rim 95 for forming the wheel via a spoke 91, and rotatably supports the tire 99 and the like. Specifically as FIGS. 1 to 3 show, the hub device includes a hub case 8 as a base part to which the spoke 91 is attached, a cylindrical sleeve 3 attached to an inner diameter portion 81 of the hub case 8 using press fitting means, bearings 4, 4 attached to both end portions 35, 35 of the cylindrical sleeve 3 (see FIG. 5), a shaft 5 as a base portion of the hub device for a bicycle, which is fitted to an inner race sides of the bearings 4, 4, nuts 2, 2 attached to both end portions of the shaft 5 for fixing the bearings 4, 4 to respective terminal ends of the shaft 5, and spherical washers 1, 1 each attached to one end surface of the nuts 2, 2 to ensure that the whole structure of the hub device for a bicycle is attached to an end portion of the fork 9. In accordance with one or more embodiments, predetermined external screws 5a and 5b are provided at both end portions of the shaft outside a portion to which the bearing is attached, e.g., as shown in FIG. 2.

In the aforementioned base structure, the sleeve 3 is formed of a predetermined metal cylindrical member, which is integrally attached to the inner diameter portion 81 of the hub case 8 via the press fitting means or adhesion means, and further screw means (see FIG. 3). A gap 89 is formed between the inner diameter portion 81 of the hub case 8 at its end and the end portion 35 of the sleeve 3 stored in the hub case 8. The aforementioned structure allows both end portions 35, 35 of the sleeve 3 to be deflected relative to a center portion 31 upon application of the load to the hub case 8 from the wheel.

Figure 4:
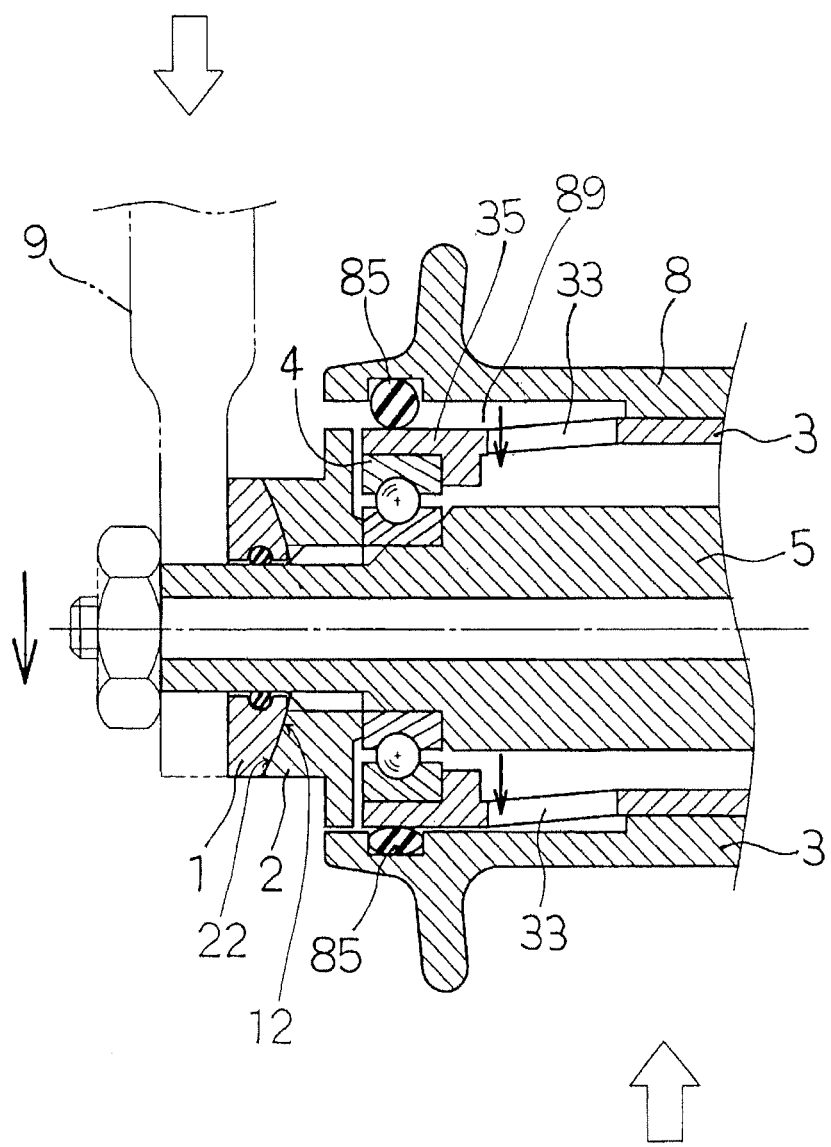
FIG. 4 is a sectional view illustrating a structure around a spherical washer and a bearing for forming the main part of the present invention.
Figure 5:
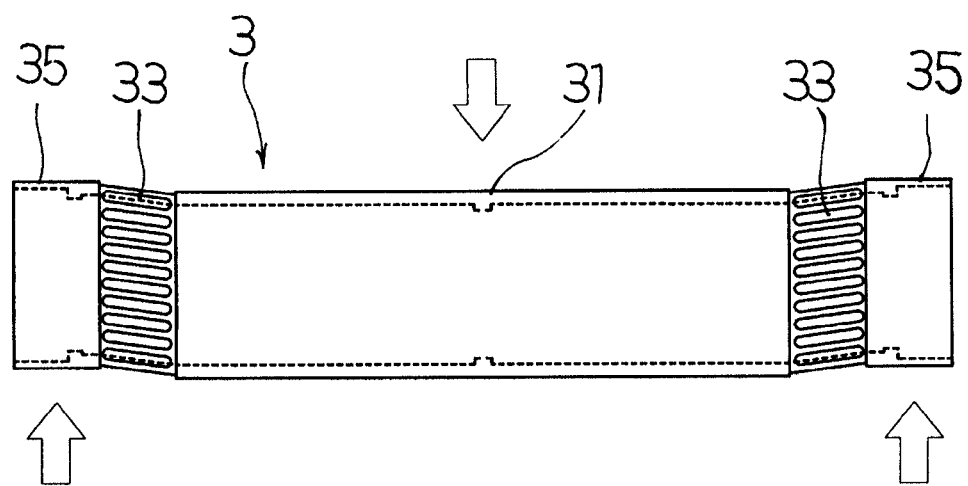
FIG. 5 is an external view illustrating a deformed state of a sleeve as the main part of the present invention.

Specifically, the end portion 35 of the sleeve 3 is vertically deformed through deflection as shown in FIG. 4, thus further deforming an O-ring 85 formed of a rubber elastic member through deflection. The resultant load is transferred to the bearing 4, the shaft 5 and the like. The thus deformation of the sleeve 3 through deflection, and further elastic deformation of the O-ring 85 formed of the rubber elastic member may attenuate the load from the wheel so as to be transferred to the shaft 5, and further to the fork 9. The impact force or intense vibration from the wheel may be attenuated and transferred to the bicycle body in the alleviated state. As the load exerted from the wheel is alleviated, the bearing 4 may be protected. A surface (spherical surface) 12 of the spherical washer 1, which is opposite the surface in contact with the fork 9 has a semi-spherical convex shape, and is brought into contact engagement with one surface of the nut 2 for fixing the bearing 4. A concave surface 22 of the nut 2, which is engaged with the convex surface 12 of the spherical washer 1 so as to be surface fitted thereto. The wheel may be attached to the fork 9 with accuracy to ensure the rotary motion of the wheel.

According to the embodiment, the predetermined gaps 89 are formed between the inner diameter portion of the hub case 8 and the outer circumference of the sleeve 3 around both end portions integrally attached to the hub case 8 using the press fit means or adhesion means, and further screw means (see FIG. 4). When the load from the wheel is exerted to the hub case 8 and transferred to the sleeve 3, the load is transferred to the shaft 5 via the bearings 4 attached to both end portions 35, 35 of the sleeve 3. The load serves to elastically deform both terminal ends of the sleeve 3 toward the gaps 89 formed at the inner diameter side of the hub case 8. The elastic deformation may alleviate the exerted load and transferred to the bearing 4. According to the embodiment, the impact exerted load or vibration may be alleviated through the elastic deformation of the sleeve 3, and then transferred to the bearing 4 and the shaft 5. As a result, the bearing 4 may be sufficiently protected.

According to the embodiment, the cylindrical member is used for forming the sleeve 3, both end portions of which are provided with plural slits 33 in the circumferential direction. As a result, both end portions of the sleeve 3 are likely to be elastically deformed with flexibility. As a result, the impact load or vibration exerted to the wheel may be alleviated and transferred to the bearing 4. This makes it possible to sufficiently protect the bearing 4.

What is claimed is:

1. A hub device for a bicycle for supporting a rotary motion of a wheel, comprising:
    a hub case which is attached to a center portion of the wheel for receiving a load exerted from a rim to which a tire is fitted via a spoke, and the hub case having each inner diameter of end portion larger than a diameter of a center portion;
    a sleeve integrally attached to the hub case at a side of the inner diameter of the hub case, which serves to transfer the load exerted on the hub case to a shaft,
    wherein the shaft rotatably supports, via a bearing, a whole structure of the wheel, which includes the sleeve and the hub case,
    wherein the sleeve is a cylindrical member and a plurality of predetermined slits are disposed around both end portions of the cylindrical member in a circumferential direction, and
    wherein the bearing receives the load exerted to the sleeve and rotatably the whole structure of the wheel.

2. The hub device for a bicycle according to claim 1, wherein:
    predetermined external screws are provided at both end portions of the shaft outside a portion to which the bearing is attached;
    a nut engaged with the external screw for fixing the bearing has a concave surface opposite a surface in contact with the bearing; and
    a spherical washer has a convex surface engaged with the concave surface, and an O-ring formed of a rubber elastic member disposed in the inner diameter surface to which the shaft is fitted.

3. A hub device for a bicycle for supporting a rotary motion of a wheel, comprising:
    a hub case attached to a center portion of the wheel for receiving a load exerted from a rim to which a tire is fitted via a spoke;
    a sleeve integrally attached to the hub case at a side of an inner diameter of the hub case, which serves to transfer the load exerted on the hub case to a shaft,
    wherein the shaft rotatably supports a whole structure of the wheel via the bearing, wherein the sleeve is a cylindrical member and a plurality of predetermined slits are disposed around both end portions of the cylindrical member in a circumferential direction, and wherein the bearing is attached to an inner diameter side of the sleeve, which serves to transfer the load exerted on the hub case to the shaft, and rotatably supports the whole structure of the wheel which includes the hub case;

a nut provided at both end portions of the shaft, and engaged with an external screw formed on both end portions of the shaft to which the bearing is attached for fixing the bearing; and a spherical washer having a convex surface to be engaged with a concave surface of the nut opposite a side in contact with the bearing, and an O-ring formed of a rubber elastic member disposed at the inner diameter side to which the shaft is fitted.

* * * * *